3,371,074
ACCELERATING VULCANIZATION OF RUBBER WITH (AZABICYCLONONYLTHIO)AZOLES
John J. D'Amico, Dunbar, W. Va., assignor to Monsanto Company, St. Louis, Mo., a corporation of Delaware
No Drawing. Continuation-in-part of application Ser. No. 327,166, Sept. 3, 1963. This application Aug. 13, 1965, Ser. No. 479,597
5 Claims. (Cl. 260—79.5)

This application is a continuation-in-part of application Ser. No. 327,166, filed Sept. 3, 1963, which latter application is a division of application Ser. No. 180,829, filed Mar. 19, 1962, now abandoned.

The present invention relates to a class of new chemical products which are at the same time azoles and 3-azabicyclo[3.2.2]nonanes. Although no class name exists for the new products they may be represented by the formula

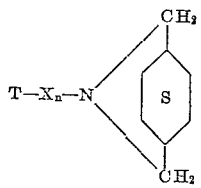

where T is the radical resulting from removing mercaptan hydrogen from an azole, X is sulfur or $CH_2$ and $n$ is zero or one. Suitable examples of azoles are:

4-ethyl-2-mercaptothiazole,
4-methyl-2-mercaptothiazole,
4,5-dimethyl-2-mercaptothiazole,
4,5-diethyl-2-mercaptothiazole,
4-methyl-5-carboethoxy-2-mercaptothiazole,
4-methyl-5-carbomethoxy-2-mercaptothiazole,
4-carboethoxy-2-mercaptothiazole,
2-mercaptobenzothiazole,
4-ethyl-2-mercaptobenzothiazole,
4-methyl-2-mercaptobenzothiazole,
5-methyl-2-mercaptobenzothiazole,
5-ethyl-2-mercaptobenzothiazole,
6-methyl-2-mercaptobenzothiazole,
7-methyl-2-mercaptobenzothiazole,
4-chloro-2-mercaptobenzothiazole,
5-chloro-2-mercaptobenzothiazole,
6-chloro-2-mercaptobenzothiazole,
4-methoxy-2-mercaptobenzothiazole,
5-ethoxy-2-mercaptobenzothiazole,
6-ethoxy-2-mercaptobenzothiazole,
4,5-dimethyl-2-mercaptobenzothiazole,
4,6-dimethyl-2-mercaptobenzothiazole,
4,6-dimethyl-7-chloro-2-mercaptobenzothiazole, and
4,6-dimethyl-5,7-dichloro-2-mercaptobenzothiazole.

It will be appreciated that the compounds conforming to the aforesaid general formula are not necessarily equivalent and the properties and uses vary depending upon the values of T, X and $n$. In general, the new compounds accelerate the vulcanization of natural and synthetic rubbers. Where $n$ is zero the resulting sulfenamides are potent accelerators of the delayed action type. They combine a high degree of processing safety at temperatures only slightly below curing temperature with very rapid curing properties at vulcanization temperature. Green tread stocks containing the new sulfenamides as accelerators possess superior storage stability. Where X is methylene and $n$ is 1, the compounds retain strong accelerating action but the delayed action properties largely disappear. These methylene compounds possess biological activity and more particularly destroy undesirable vegetation upon application to foliage. In some instances biological activity was observed with the sulfenamides but these were rarely toxic to plants. However, some of them are toxic to microorganisms.

There is some question as to whether the methylene radical in the products from azole, formaldehyde and 3-azabicyclo[3.2.2]nonane is linked to nitrogen in the azole ring or to sulfur outside the ring. For example the mercaptobenzothiazole derivative may be represented as

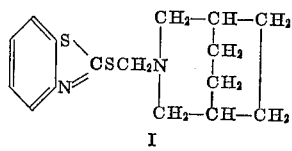

I or

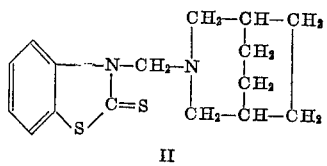

II

Evidence from ultra violet analysis indicates that essentially all the product is in the form of structure II but the invention is not limited to any theory of the precise configuration of the new compounds. It will be appreciated that T in the above formula when derived from mercaptobenzothiazole, for example by removing mercaptan hydrogen, may be either the benzothiazolylthio radical or its tautomer the benzothiazolinethione radical.

The following examples illustrate the invention including preparation of the new compounds but in no manner are to be construed as limitative. In these examples 3-azabicyclo[3.2.2]nonane is designated as "amine."

Example 1

A solution was prepared comprising 34.4 grams (0.2 mole) of 97% 2-mercaptobenzothiazole, 17 grams (0.21 mole) of 37% formaldehyde and 200 ml. of acetone. This solution was heated at 55–56° C. for one hour to effect solution. While continuing the stirring there was added to the solution at 25° C. in one portion 25 grams (0.20 mole) of amine. A precipitate formed immediately and the temperature rose from 25 to 42° C. The reaction mixture was stirred at 25–30° C. for two hours and then cooled to 0° C. The precipitate was collected by filtration and air-dried at 25–30° C. 3-(3-azabicyclo[3.2.2]non-3-ylmethyl)-2-benzothiazolinethione was obtained in 98% yield. After recrystallization from alcohol the light tan solid melted at 134–136° C. Analysis gave 8.9% nitrogen and 21.3% sulfur compared to 9.2% nitrogen and 21.1% sulfur calculated for $C_{16}H_{20}N_2S_2$. The product was insoluble in heptane and water but soluble in ether, benzene, hot acetone and hot ethanol.

Example 2

Following the procedure described in detail in Example 1, with the exception that 42.4 grams (0.2 mole) of 6-ethoxy-2-mercapto-benzothiazole was employed in place of 2-mercaptobenzothiazole, the temperature rose from 25 to 33° C. and a precipitate formed after 15 minutes. 3-(3-azabicyclo[3.2.2]non - 3-ylmethyl) - 6-ethoxy-2-benzothiazolinethione was obtained in 79.5% yield as a gray solid. After recrystallization from alcohol it melted at 118–119° C. Analysis gave 8.1% nitrogen and 18.3% sulfur compared to 8.0% nitrogen and 18.4% sulfur calculated for $C_{18}H_{24}N_2OS_2$. The product was insoluble in water but soluble in ether, acetone, benzene, hot heptane and hot ethanol.

Example 3

Again proceeding as described in Example 1, 40.3 grams (0.2 mole) of 5-chloro-2-mercaptobenzothiazole was substituted for 2-mercaptobenzothiazole. The temperature rose from 25 to 35° C. upon addition of the amine. The solution was cooled to −5° C. before filtration. 3-(3-azabicyclo[3.2.2]non-3-ylmethyl) - 5-chloro-2-benzothiazolinethione was obtained in 34.2% yield as a cream solid. After recrystallization from alcohol it melted at 151–153° C. Analysis gave 8.2% nitrogen and 18.8% sulfur compared to 8.2% nitrogen and 18.9% sulfur calculated for $C_{16}H_{19}ClN_2S_2$. The product was insoluble in water and heptane but soluble in acetone, hot benzene, hot ethanol and slightly soluble in ether.

Example 4

A solution comprising 45 grams (0.21 mole) of 6-ethoxy-2-mercaptobenzothiazole, 40 grams (0.316 mole) of amine and 300 ml. of isopropyl alcohol was stirred and heated at 45–50° C. for one hour. Thereupon there was added at 45–50° C. over a 2 hour period 165 ml. (0.316 mole) of sodium hypochlorite solution containing 14.28 grams hypochlorite per 100 ml. The temperature was held at 45–50° C. for an additional hour and then 5 grams of sodium sulfite and 1000 ml. of water were added. After cooling to 10° C., the precipitate was removed by filtration, washed with water until neutral to litmus and air-dried at 25–30° C. 3-(6-ethoxy-2-benzothiazolylthio)-3-azabicyclo[3.2.2]nonane was obtained in 98.5% yield as a brown solid. After recrystallization from heptane it melted at 117–118° C. Analysis gave 8.4% nitrogen and 18.8% sulfur compared to 8.4% nitrogen and 19.2% sulfur calculated for $C_{17}H_{22}N_2OS_2$. The product was insoluble in water but soluble in ether, acetone, benzene, hot heptane and hot ethanol.

Example 5

In the procedure of Example 4, a solution comprising 50.4 grams (0.25 mole) of 5-chloro-2-mercaptobenzothiazole, 47 grams (0.375 mole) of amine and 300 ml. of isopropyl alcohol was used and the solution heated at 50–60° C. for one hour before addition of sodium hypochlorite. 3-(5-chloro-2-benzothiazolylthio) - 3-azabicyclo[3.2.2]nonane was obtained in 69% yield melting at 101–102° C. after recrystallization from ethyl alcohol. Analysis gave 8.6% nitrogen and 11.2% chlorine compared to 8.6% nitrogen and 10.9% chlorine calculated for $C_{15}H_{17}ClN_2S_2$. The product was insoluble in water but soluble in ether, benzene, hot acetone, hot heptane and hot ethanol.

Example 6

A solution comprising 50.8 grams (0.25 mole) of ethyl 2-mercapto - 4-methyl - 5-thiazolecarboxylate, 400 ml. of isopropyl alcohol and 47 grams (0.375 mole) of amine was stirred and heated at 45–50° C. for one hour, then cooled to 45° C. and 197 ml. (0.375 mole) of sodium hypochlorite solution containing 14.28 grams hypochlorite per 100 ml. added dropwise at 45–50° C. over a period of two hours. The solution was held at 45–50° C. for another hour and then 5 grams of sodium sulfite and 1000 ml. of water added. After cooling to 10° C., the precipitate was collected by filtration, washed with water until neutral to litmus and air-dried at 25–30° C. Ethyl 2-(3-azabicyclo[3.2.2]non-3-ylthio) - 4-methyl - 5-thiazolecarboxylate was obtained in 97% yield as a cream solid. After recrystallization from heptane it melted at 66–67° C. Analysis gave 8.6% nitrogen and 19.3% sulfur compared to 8.6% nitrogen and 19.6% sulfur calculated for $C_{15}H_{22}N_2O_2S_2$. It was soluble in ether, acetone, benzene, heptane and ethanol.

Example 7

A solution comprising 32.8 grams (0.25 mole) of 4-methyl-2-mercaptothiazole, 300 ml. of isopropyl alcohol and 47 grams (0.375 mole) of amine was stirred and heated at 45–50° C. for one hour. Thereupon there was added below the surface at 45–50° C. over a two hour period 197 ml. (0.375 mole) of sodium hypochlorite solution containing 14.28 grams hypochlorite per 100 ml. The temperature was held at 45–50° C. for an additional hour and then 5 grams of sodium sulfite and 1000 ml. of water added. After cooling to 25° C. the reaction mixture was extracted with 400 ml. of ethyl ether, the ether solution washed with water until neutral to litmus and dried over sodium sulfate. The ether was removed in vacuo at a maximum temperature of 30° C./1–2 mm. An oily solid resulted in 97.5% yield. After recrystallization from ethyl alcohol, 3-(4-methyl-2-thiazolylthio) - 3-azabicyclo-[3.2.2]nonane was obtained as a tan solid melting at 69–70° C. The yield of the purified product was 51.7%. It contained 11.1% nitrogen and 24.7% sulfur compared to 11.0% nitrogen and 25.2% sulfur calculated for $C_{12}H_{18}N_2S_2$. Solubilities were similar to the product of Example 6.

Example 8

A solution was prepared comprising 43.3 grams (0.25 mole) of 2-mercapto - 4 - methyl - 5 - thiazolyl methyl ketone, 300 ml. of isopropyl alcohol and 47 grams (0.375 mole) of amine. The solution was then heated and stirred at 45–50° C. for one hour whereupon there was added below the surface at 45–50° C. over a two hour period 197 ml. (0.375 mole) of sodium hypochlorite solution containing 14.28 grams hypochlorite per 100 ml. The temperature was held at 45–50° C. for an additional hour, then reduced to 25° C. and 5 grams of sodium sulfite, 500 ml. of water and 500 ml. of ethyl ether added. The reaction mixture was stirred at 25–30° C. for 15 minutes, the top ether layer separated, washed with water until neutral to litmus and dried over sodium sulfate. The ether was removed in vacuo at a maximum temperature of 30° C./1–2 mm. The oil obtained was dissolved in heptane-ethyl alcohol and allowed to stand for 24 hours. After cooling to 0° C. the precipitate was filtered and dried at 25–30° C. 2 - (3 - azabicyclo[3.2.2]non - 3 - ylthio)-4-methyl-5-thiazolyl methyl ketone was obtained in 20.2% yield as a yellow solid melting at 128–130° C. Analysis gave 9.3% nitrogen and 20.7% sulfur compared to 9.4% nitrogen and 21.6% sulfur calculated for $C_{14}H_{20}N_2OS_2$. Solubilities were similar to those of Example 6.

Example 9

In the procedure of Example 6, 41.6 grams (0.125 mole) of 2,2' - dithiobis benzothiazole was substituted for the thiazole of that example and 123 ml. (0.225 mole) of sodium hypochlorite solution containing 13.6 grams hypochlorite per 100 ml. added dropwise at 45–50° C. over a two hour period. After isolating the product as described it was air-dried at 50° C. 3 - (2 - benzothiazolylthio)-3-azabicyclo[3.2.2]nonane was obtained in 99% yield as a light tan solid. After recrystallization from heptane it melted at 98–99° C. Analysis gave 9.3% nitrogen and 22.1% sulfur compared to 9.7% nitrogen and 22.1% sulfur calculated for $C_{15}H_{18}N_2S_2$. The product was insoluble in water and heptane, soluble in acetone and benzene and slightly soluble in ether and ethanol.

Example 10

A charge comprising 87.2 grams (0.3 mole) of the product of Example 9, 9.6 grams of sulfur, 37.5 grams (0.3 mole) of amine and 300 ml. of ethyl alcohol was heated at refluxing temperature (75–80° C.) for two hours. The stirred solution was then cooled to 0° C. and 100 ml. of heptane added. After maintaining the product at −10 to 0° C. for an hour, the precipitate was collected by filtration and air-dried at 25–30° C. 3 - (2 - benzothiazolyldithio) - 3 - azabicyclo[3.2.2]nonane was obtained in 95.5% yield as a light yellow solid. After recrystallization from alcohol it melted at 113–115° C.

Analysis gave 8.4% nitrogen and 29.9% sulfur compared to 8.7% nitrogen and 29.8% sulfur calculated for $$C_{15}H_{18}N_2S_3$$

The product was insoluble in water but soluble in ether, acetone, benzene and hot ethanol and slightly soluble in hot heptane.

Rubbers in which the products of the present invention are useful as accelerators include both natural rubber and synthetic rubber. Rubber includes sulfur vulcanizable diene polymers, preferably those containing a major proportion of diene polymer and preferably hydrocarbon rubbers but includes copolymers of diene hydrocarbons and acrylonitrile and isobutylene copolymerized with a small amount of diene (butyl rubber). Isoprene or butadiene-1,3 copolymers with vinyl monomers copolymerizable therewith, as for example styrene, are illustrative. The new sulfenamides are superior to accelerators heretofore available for synthetic stereo specific rubbers like cis-1,4-polybutadiene. The invention will be further illustrated in connection with the data in the tables below.

A typical natural rubber tire tread stock was compounded by milling together the ingredients in the following base formula:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Antioxidant | 1.0 |
| Sulfur | 2.5 |

To the above there was added in separate stocks 0.5 part of accelerator as follows:

Stock

A—3-(2-benzothiazolylthio)-3-azabicyclo[3.2.2]nonane

B—3-(6-ethoxy-2-benzothiazolylthio)-3-azabicyclo[3.2.2]nonane

C—Ethyl 2-(3-azabicyclo[3.2.2]non-3-ylthio)-4-methyl-5-thiazolecarboxylate

D—3-(4-methyl-2-thiazolylthio)-3-azabicyclo[3.2.2]nonane

E—3-(5-chloro-2-benzothiazolylthio)-3-azabicyclo[3.2.2]nonane

F—2-(3-azabicyclo[3.2.2]non-3-ylthio)-4-methyl-5-thiazolyl methyl ketone

G—3-(3-azabicyclo[3.2.2]non-3-ylmethyl)-6-ethoxy-2-benzothiazolinethione

H—3-(3-azabicyclo[3.2.2]non-3-ylmethyl)-2-benzothiazolinethione

J—3-(3-azabicyclo[3.2.2]non-3-ylmethyl)-5-chloro-2-benzothiazolinethione

The above stocks so compounded were cured in the usual manner by heating in a press at 144° C. The modulus and tensile properties of the 45 minute cures are recorded below:

TABLE I

| Stock | Modulus of Elasticity in lbs./in.² at 300% Elongation | Tensile at Break in lbs./in.² |
|---|---|---|
| A | 2,830 | 4,750 |
| B | 2,570 | 4,800 |
| C | 2,840 | 4,770 |
| D | 2,940 | 4,860 |
| E | 2,770 | 4,750 |
| F | 2,670 | 4,050 |
| G | 2,210 | 4,250 |
| H | 2,510 | 4,580 |
| J | 2,570 | 4,460 |

The product of Example 10 is both vulcanizing agent and accelerator. Eliminating the sulfur from the above base stock and adding 4.7 parts of the product of Example 10 resulted in a stock which after heating 30 minutes at 144° C. developed a tensile strength of 4200 pounds per square inch and at the same time possessed considerable processing safety.

In a similar manner the new compounds were tested as vulcanization accelerators in a synthetic rubber tire tread stock. Butadiene-styrene copolymer rubber was blended in a standard formula as follows:

| | Parts by weight |
|---|---|
| SB–R 1500 | 100.0 |
| Carbon black | 50.0 |
| Zinc oxide | 4.0 |
| Stearic acid | 2.0 |
| Saturated hydrocarbon softener | 10.0 |
| Antioxidant | 1.0 |
| Sulfur | 1.75 |

The accelerator was added to the stock in molecularly equivalent amount employing 0.0045 mole of each accelerator.

Stock

K—3-(2-benzothiazolylthio)-3-azabicyclo[3.2.2]nonane

L—3-(6-ethoxy-2-benzothiazolylthio)-3-azabicyclo[3.2.2]nonane

M—3-(5-chloro-2-benzothiazolylthio)-3-azabicyclo[3.2.2]nonane

N—3-(4-methyl-2-thiazolylthio)-3-azabicyclo[3.2.2]nonane

O—Ethyl 2-(3-azabicyclo[3.2.2]non-3-ylthio)-4-methyl-5-thiazolecarboxylate

P—Commercial sulfenamide accelerator

Processing safety of the vulcanizable mixes was evaluated by means of a Mooney plastometer. The figures recorded were the times required for the Mooney plasticity at 135° C. to rise ten points above the minimum value.

TABLE II

| Stock | Mooney scorch in mins. at 135° C. |
|---|---|
| K | 33.4 |
| L | 32.7 |
| M | 33.3 |
| N | 27.2 |
| O | 30.9 |
| P | 25.4 |

The time for the Mooney scorch to rise from ten points above the minimum to thirty-five points above the minimum furnishes a measure of the cure rate. These results are shown in Table III.

TABLE III

| Stock | Time for Mooney scorch to rise from 10 to 35 points above minimum |
|---|---|
| K | 2.6 |
| L | 2.7 |
| M | 2.9 |
| N | 1.9 |
| O | 2.2 |
| P | 3.5 |

The compositions were vulcanized by heating for different periods of time in the usual manner in a press at 144° C. The modulus and tensile properties of the 60-minute cures are recorded below:

TABLE IV

| Stock | Modulus of Elasticity in lbs./in.² at 300% Elongation | Tensile at Break in lbs./in.² |
|---|---|---|
| K | 1,730 | 3,830 |
| L | 1,630 | 3,580 |
| M | 1,660 | 3,650 |
| N | 1,700 | 3,650 |
| O | 1,850 | 3,620 |
| P | 1,500 | 3,600 |

These data in Tables II, III and IV demonstrate the higher processing safety, faster curing and stronger acceleration of the products compared to a commercial delayed action accelerator. Substituting the molecularly equivalent amount (1.45 parts) of 3-(2-benzothiazolyldithio)-3-azabicyclo[3.2.2]nonane in the K stock further shortened the curing time. The stock developed a 300% modulus of 1880 pounds per square inch and an ultimate tensile of 3520 pounds per square inch after curing 30 minutes at 144° C. The time for Mooney scorch to rise from 10 to 35 points above the minimum was 2.9 minutes.

To demonstrate the effectiveness of the accelerators of this invention in cis-polybutadiene, the rubber was compounded by milling together the ingredients in the following base formula:

| | Parts by weight |
|---|---|
| Cis-1,4-polybutadiene | 100.0 |
| Aromatic oil softener | 5.0 |
| Pine tar | 5.0 |
| Stearic acid | 2.0 |
| Antioxidant | 1.0 |
| Zinc oxide | 3.0 |
| Carbon black | 50.0 |
| Sulfur | 1.75 |

To the above there was added in separate stocks 0.8 part of accelerator as follows:

Stock
Q—3-(2-benzothiazolylthio)-3-azabicyclo[3.2.2]nonane
R—Ethyl 2-(3-azabicyclo[3.2.2]non-3-ylthio)-4-methyl-5-thiazolecarboxylate
S—3-(5-chloro-2-benzothiazolylthio)-3-azabicyclo[3.2.2]nonane
T—Commercial sulfenamide accelerator Resistance to vulcanization at 135° C. of the stocks so compounded was determined as described above. The stocks were vulcanized by heating in a press for 30 minutes at 144° C. The vulcanizates were tested for stress, tensile strength and hardness. The results are recorded in Table V.

TABLE V

| Stock | Mooney Scorch in Mins. at 135° C. | Modulus of Elasticity in lbs./in.² at 300% Elongation | Tensile at Break in lbs./in.² | Hardness |
|---|---|---|---|---|
| Q | 23.1 | 1,150 | 2,650 | 65 |
| R | 21.4 | 1,190 | 2,560 | 65 |
| S | 26.2 | 1,010 | 2,490 | 62 |
| T | 18.1 | 980 | 2,400 | 63 |

From the above data it may readily be seen that the new compounds are effective accelerators for cis-polybutadiene and are superior to the commercial delayed action accelerator in this respect. Also, they are far less scorchy as shown by the higher Mooney scorch values.

Smaller amounts of the accelerators may be employed than those indicated in the examples. Amounts as small as 0.1% by weight on the rubber as well as amounts higher than those specifically shown, as for example up to 5% by weight on the rubber, may be employed depending upon the nature of the rubber, the other compounding ingredients used and the objectives of the compounder.

The methylene compounds as for example the products of Examples 1, 2 and 3 also possess the property of promoting interaction of carbon black with elastomers. The rubber together with a relatively large amount of reinforcing pigment and 0.05–5% of the rubber of promoter are heated and masticated within the range of about 250–370° F. for a time sufficient to promote rubber-filler interaction. Curatives are then added and the stock vulcanized in the usual manner. Employing 0.3 part by weight of the product of Example 1 in a mixture of 75 parts smoked sheets, 25 parts styrene-butadiene copolymer rubber and 40 parts carbon black lowered the torsional hysteresis of the vulcanizate about 10%.

It is intended to cover all changes and modifications of the examples of the invention herein chosen for purposes of disclosure which do not constitute departures from the spirit and scope of the invention.

What is claimed is:
1. The process of vulcanizing a sulfur-vulcanizable diene rubber which comprises heating the rubber and sulfur in the presence of a small amount sufficient to accelerate vulcanization of a compound of the formula

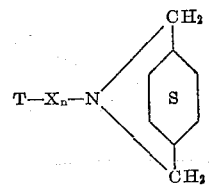

where T is the radical resulting from removing mercaptan hydrogen from an azole selected from the group consisting of 4-(lower alkyl)-2-mercaptothiazole, 4,5-di(lower alkyl)-2-mercaptothiazole, 4-(lower alkyl)-5-(lower carboalkoxy)-2-mercaptothiazole, 4-(lower carboalkoxy)-2-mercaptothiazole, 2-mercaptobenzothiazole, monochloro-2-mercaptobenzothiazole, mono- and di(lower alkyl)-2-mercaptobenzothiazole, mono(lower alkoxy)-2-mercaptobenzothiazole, mono(lower alkyl)-monochloro-2-mercaptobenzothiazole and di(lower alkyl)-dichloro-2-mercaptobenzothiazole, X is selected from a group consisting of sulfur and methylene, and $n$ is an integer from zero to one, inclusive.

2. The process of vulcanizing a sulfur-vulcanizable diene rubber which comprises heating the rubber and sulfur in the presence of a small amount sufficient to accelerate vulcanization of a compound of the formula

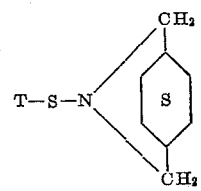

where T is a thiazolyl group selected from a group consisting of 4-(lower alkyl)-2-thiazolyl, 4,5-di(lower alkyl)-2-thiazolyl, 4-(lower alkyl)-5-(lower carboalkoxy)-2-thiazolyl, 4-(lower carboalkoxy)-2-thiazolyl, 2-benzothiazolyl, monochloro-2-benzothiazolyl, mono- and di(lower alkyl)-2-benzothiazolyl, mono(lower alkoxy)-2-benzothiazolyl, mono(lower alkyl)-monochloro-2-benzothiazolyl and di(lower alkyl-dichloro-2-benzothiazolyl.

3. The process of vulcanizing a sulfur-vulcanizable diene rubber which comprises heating the rubber and sulfur in the presence of a small amount sufficient to accelerate vulcanization of 3-(2-benzothiazolylthio)-3-azabicyclo[3.2.2]nonane.

4. The process of vulcanizing a sulfur-vulcanizable diene rubber which comprises heating the rubber and sulfur in the presence of a small amount sufficient to accelerate vulcanization of ethyl 2-(3-azabicyclo[3.2.2]non-3-ylthio)-4-methyl-5-thiazolecarboxylate.

5. The process of vulcanizing a sulfur-vulcanizable diene rubber which comprises heating the rubber and sulfur in the presence of a small amount sufficient to accelerate vulcanization of 3-(4-methyl-2-thiazolylthio)-3-azabicyclo[3.2.2]nonane.

No references cited.

JOSEPH L. SCHOFER, *Primary Examiner.*

D. DENENBERG, *Assistant Examiner.*